United States Patent
Surnilla (10) Patent No.: US 8,578,893 B2
(45) Date of Patent: Nov. 12, 2013

(54) MULTI-STROKE HYBRID PROPULSION SYSTEM

(75) Inventor: Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/492,420

(22) Filed: Jun. 8, 2012

(65) Prior Publication Data

US 2012/0247408 A1 Oct. 4, 2012

Related U.S. Application Data (62) Division of application No. 12/146,229, filed on Jun. 25, 2008, now Pat. No. 8,197,383.

(51) Int. Cl.
*F02B 69/06* (2006.01)

(52) U.S. Cl.
USPC ........... 123/21; 123/3; 123/65 VD; 123/192.1

(58) Field of Classification Search
USPC ......... 123/21, 2, 3, 65 VD, 192.1; 180/65.28; 903/905; 477/107, 110; 701/114
See application file for complete search history.

(56) References Cited

U.S. PATENT DOCUMENTS

| | | | |
|---|---|---|---|
| 2,633,110 A * | 3/1953 | Parsons | 123/21 |
| 4,353,334 A * | 10/1982 | Neitz | 123/179.21 |
| 5,036,801 A | 8/1991 | Imajou | |
| 5,113,805 A * | 5/1992 | Kawamura | 123/21 |
| 5,158,044 A | 10/1992 | Kawamura | |
| 6,173,569 B1 | 1/2001 | Kusada et al. | |
| 6,257,176 B1 | 7/2001 | Shimasaki et al. | |
| 6,971,338 B2 | 12/2005 | Kobayashi et al. | |
| 6,986,399 B2 | 1/2006 | Bhavsar et al. | |
| 7,021,272 B2 | 4/2006 | Singh | |
| 7,036,465 B2 | 5/2006 | Burk et al. | |
| 7,082,898 B2 | 8/2006 | Kitamura et al. | |
| 7,231,892 B2 | 6/2007 | Kojic et al. | |
| 7,377,236 B2 | 5/2008 | Reed et al. | |
| 7,470,209 B2 | 12/2008 | Holmes et al. | |
| 7,549,412 B2 | 6/2009 | Singh | |
| 7,673,590 B2 | 3/2010 | Reed et al. | |
| 7,694,760 B2 | 4/2010 | Leone et al. | |
| 7,717,071 B2 | 5/2010 | Lewis et al. | |
| 7,722,498 B2 | 5/2010 | Kawasaki et al. | |
| 7,765,964 B2 | 8/2010 | Ichimoto | |
| 7,765,966 B2 | 8/2010 | Leone | |
| 7,775,310 B2 | 8/2010 | Andri | |
| 7,849,835 B2 | 12/2010 | Tripathi et al. | |
| 7,867,133 B2 | 1/2011 | Petridis et al. | |
| 7,870,723 B2 | 1/2011 | Elwart et al. | |
| 7,874,203 B2 | 1/2011 | Suzuki | |

(Continued)

*Primary Examiner* — Noah Kamen
*Assistant Examiner* — Long T Tran
(74) *Attorney, Agent, or Firm* — Julia Voutyras; Alleman Hall McCoy Russell & Tuttle LLP (57) ABSTRACT

A hybrid propulsion system for a vehicle and method of operation are described. In one example, the engine may operate in a two stroke cycle to provide increased engine torque when a recharging operation of the on-board energy storage device is requested. Further, a transition from a four stroke cycle to the two stroke cycle may be performed while maintaining the transmission in the previously selected gear ratio in response to a requested increase in charging or a requested increase in wheel torque as requested by the vehicle operator.

17 Claims, 9 Drawing Sheets

(56) References Cited

U.S. PATENT DOCUMENTS

| | | |
|---|---|---|
| 7,886,715 B2 | 2/2011 | Tripathi et al. |
| 7,900,598 B2 | 3/2011 | Lewis et al. |
| 7,954,474 B2 | 6/2011 | Tripathi et al. |
| 7,963,267 B2 | 6/2011 | Surnilla et al. |
| 8,110,832 B2 | 2/2012 | Hiroshima |
| 2003/0192489 A1* | 10/2003 | Singh .......................... 123/25 C |
| 2005/0205020 A1* | 9/2005 | Lewis et al. ...................... 123/21 |
| 2005/0211194 A1* | 9/2005 | Hanson et al. ................... 123/21 |
| 2007/0012265 A1* | 1/2007 | Lewis et al. ...................... 123/21 |
| 2007/0113803 A1* | 5/2007 | Froloff et al. ............... 123/90.11 |
| 2008/0041327 A1* | 2/2008 | Lewis et al. ................. 123/179.3 |

\* cited by examiner

MULTI-STROKE HYBRID PROPULSION SYSTEM

CROSS REFERENCE TO RELATED APPLICATIONS

The present application is a divisional of U.S. patent application Ser. No. 12/146,229 filed Jun. 25, 2008, the entire contents of which are incorporated herein by reference for all purposes.

BACKGROUND AND SUMMARY

Some vehicles may include a hybrid propulsion system which comprises an internal combustion engine and a secondary propulsion source such as an electric motor. These hybrid propulsion systems typically include an energy storage device that may be used to power the secondary propulsion source. In the context of a hybrid electric vehicle (HEV), the energy storage device may include batteries or capacitors that can be discharged to power an electric motor in order to propel the vehicle with or without assistance from the engine. The engine may also be operated to charge the energy storage device by operating a generator.

The inventors herein have recognized several issues with this approach. For example, as a charging operation is initiated, the generator may begin to absorb at least some of the engine output, which may reduce the amount of propulsive effort that is available to the drive wheels. As such, a vehicle operator may perceive a reduction in the responsiveness of the vehicle when the engine is being used to charge the energy storage device. In other examples, initiation of a charging operation may be accompanied by transmission shifting in order to maintain sufficient torque at the drive wheels. However, transmission shifting may also be perceived by the vehicle operator as the energy storage device is cycled in and out of its charging state. Furthermore, transmission shifting may additionally reduce the overall efficiency of the hybrid propulsion system.

To address some of these issues the inventors have provided a method of operating a hybrid propulsion system for a vehicle, including an internal combustion engine, a generator, and an energy storage device. As one example, the method comprises: operating the engine, during a first condition, in a two stroke cycle to produce a first engine output and charging the energy storage device by absorbing a first amount of the first engine output at the generator; and during a second condition, operating the engine in a four stroke cycle to produce a second engine output. In some examples, the engine may not be used to charge the energy storage device while operating in the four stroke cycle. The engine may also be transitioned between operation in the two stroke cycle and operation in the four stroke cycle while maintaining the transmission in the same gear ratio.

As another example, a hybrid propulsion system for a vehicle is provided. The hybrid propulsion system comprises: an internal combustion engine configured to produce an engine output, said engine operatively coupled with one or more drive wheels of the vehicle via a transmission; a motor configured to produce a motor output, said motor operatively coupled with said one or more drive wheels of the vehicle; an energy storage device configured to selectively supply energy to the motor; a control system configured to: increase a level of propulsive effort provided to said one or more drive wheels during a lower state of charge of the energy storage device by reducing a number of strokes performed by the engine per combustion cycle to increase the engine output produced by the engine; and increase a level of propulsive effort provided to said one or more drive wheels during a higher state of charge of the energy storage device by increasing an amount of energy supplied to the motor from the energy storage device to increase the motor output produced by the motor.

In this way, the engine may be operated in a two stroke cycle while performing a charging operation to take advantage of the increased power density of the engine as compared to the four stroke cycle. The increased power density of the engine can enable the charging operation to be performed while maintaining the previously selected gear ratio at the transmission, thereby reducing the number of shifts performed by the transmission. Still other examples and advantages will be described in greater detail herein.

DETAILED DESCRIPTION

A hybrid propulsion system for a vehicle is described, which utilizes multi-stroke engine operation to facilitate charging of the energy storage device residing on-board the vehicle. The multi-stroke engine operation described herein enables the engine to carry out combustion by utilizing two or more different modes of operation. For example, in a first mode, the engine may be operated in a four stroke cycle, whereby each cylinder of the engine utilizes four piston strokes per combustion event to generate an engine output torque. In a second mode, the engine may be operated in a two stroke cycle, whereby each cylinder of the engine instead utilizes two piston strokes per combustion event to generate the engine output torque. In still other examples, six or eight stroke modes of operation may be utilized by the engine. Therefore, while various examples will be described in the context of an engine that can operate in a two stroke cycle and a four stroke cycle, the engine may utilize six and eight stroke cycles in other examples without departing from the scope of the present disclosure.

Figure 1:
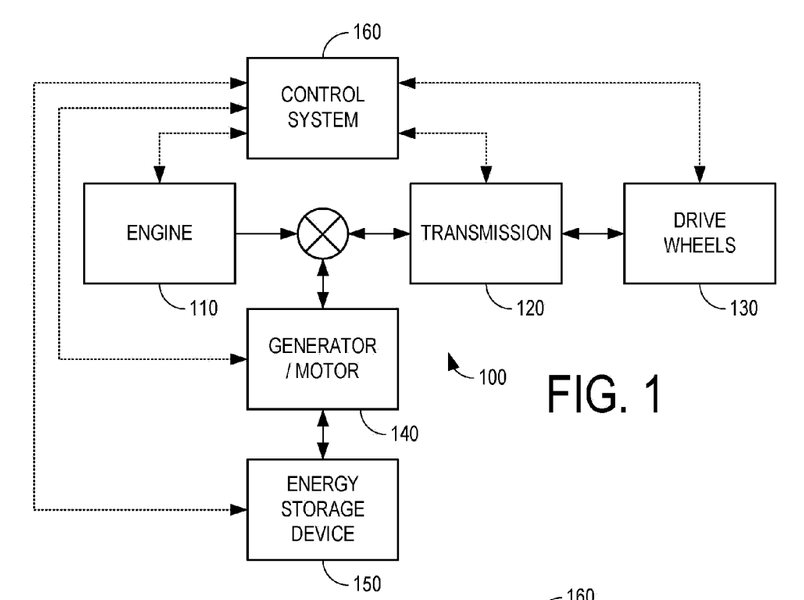
FIGS. 1 and 2 depict example hybrid propulsion systems for a vehicle.
Figure 2:
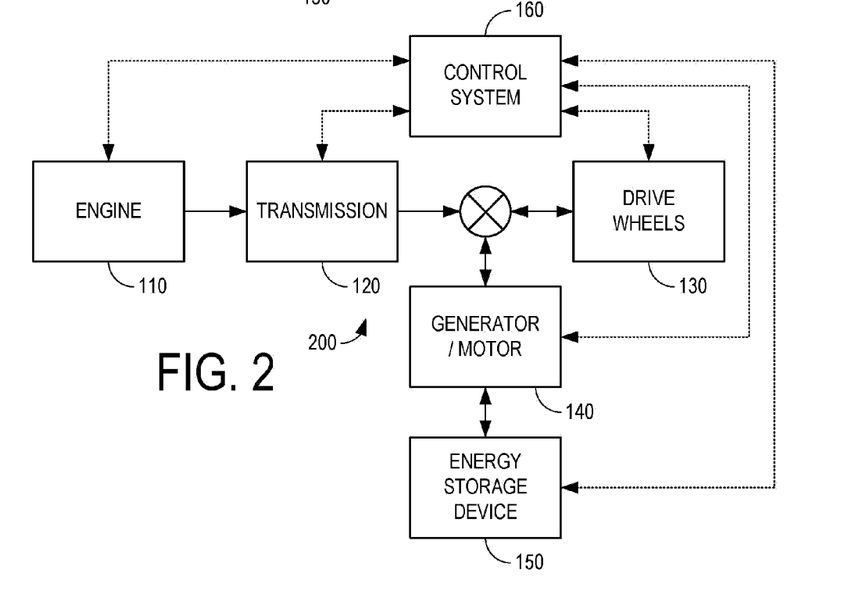

FIGS. 1 and 2 depict non-limiting examples of a hybrid propulsion system for a vehicle. Referring specifically to FIG. 1, a first example hybrid propulsion system 100 is depicted schematically. Hybrid propulsion system 100 includes a multi-cylinder internal combustion engine 110. An example cylinder of internal combustion engine 110 is described in greater detail with reference to FIG. 10. Engine 110 may be operatively coupled to one or more drive wheels 130 via a transmission 120. Transmission 120 may include a plurality of different selectable gear ratios.

Hybrid propulsion system 100 may also include one or more electric generators and/or motors. As one example, a generator and motor may be provided via an electric machine 140. In other examples, the generator may be provided by a separate electric machine than the motor. The generator and motor can be operatively coupled with an energy storage device 150.

Energy storage device 150 may include one or more batteries and/or capacitors that are configured to selectively store electrical energy that is generated by the generator and to selectively supply electrical energy to the motor for producing a motor output. The motor output may be used to propel the vehicle without assistance of the engine, the motor output may be used to propel the vehicle by supplementing the engine output, or the motor output may be used to provide engine cranking during start-up of the engine.

In some examples, the generator can generate electrical energy by absorbing at least some of the engine output that is produced by the engine or the generator can absorb kinetic energy of the vehicle as transmitted to the generator from the drive wheels via the transmission, thereby providing a regenerative braking operation for the vehicle. In this way, the generator can charge the energy storage device. In some examples, energy storage device 150 may also receive electrical energy, during a stationary charging operation, from an energy source that is external the vehicle, such as via a cable coupled with an electrical power source.

A control system 160 may be provided to control operation of the various components of the hybrid propulsion system. For example, control system 160 can receive operating condition information from the engine, the transmission, the drive wheels, the generator, the motor, and the energy storage device, among other vehicle components. The control system can also issue control commands to the engine, the transmission, the drive wheels, the generator, the motor, and the energy storage device, among other vehicle components as will be described with reference to the described process flows. As a non-limiting example, control system 160 may include one or more electronic controllers. Control system 160 will be described in greater detail with reference to FIG. 10.

FIG. 2 provides a second example hybrid propulsion system 200. Hybrid propulsion system 200 may include many of the same components of hybrid propulsion system 100, except that the generator and motor may be arranged on the opposite side of the transmission from the engine. In still other examples, one or more generators or motors may be provided on each side of the transmission. Regardless of the particular configuration of the hybrid propulsion system, the various process flows described herein may nonetheless be applicable to controlling their operation.

Figure 3:
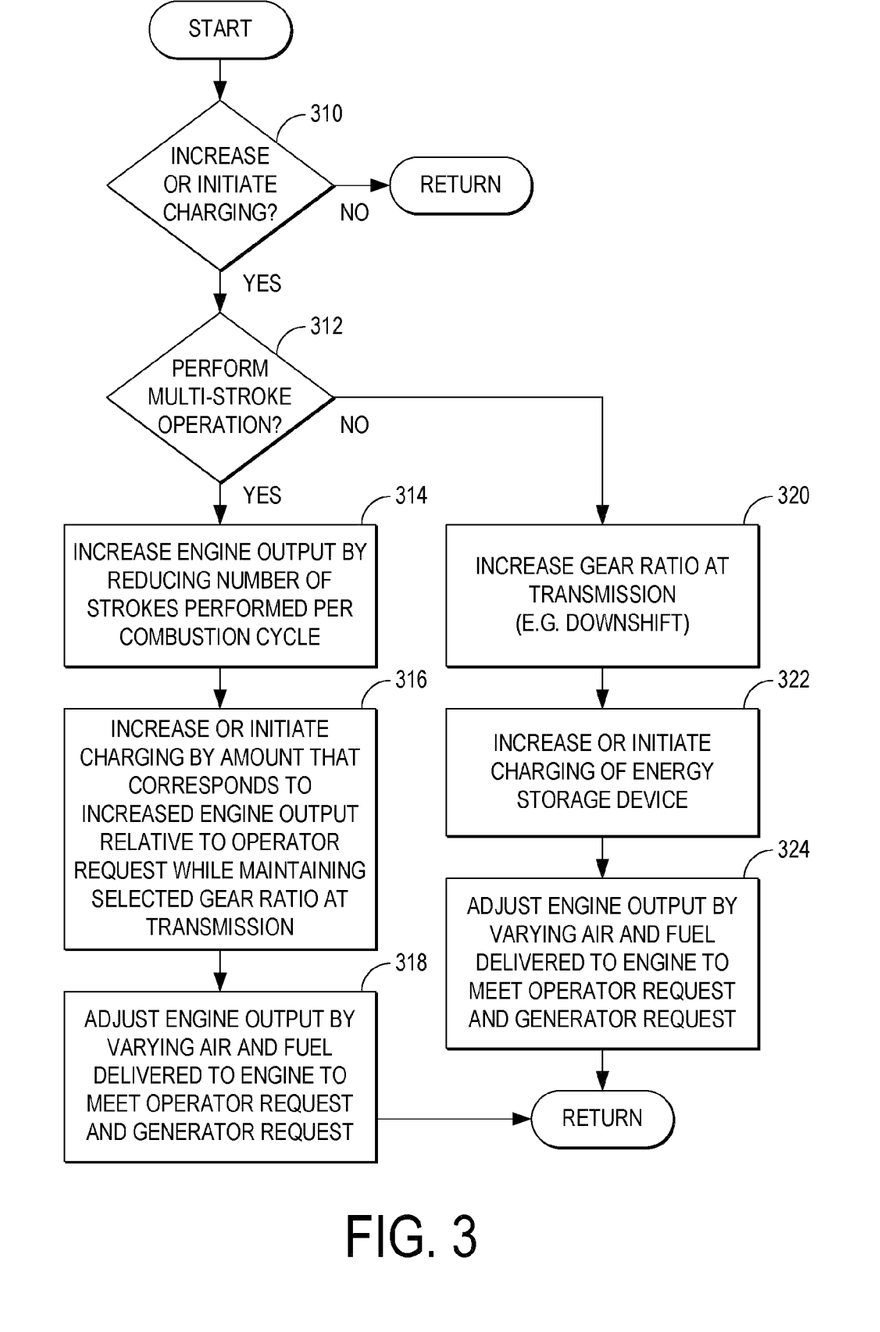
FIGS. 3-7 show flow charts depicting example process flows that may be used to control the hybrid propulsion systems of FIGS. 1 and 2.

FIG. 3 shows a flow chart depicting a process flow that may be utilized with a hybrid propulsion system for a vehicle, including hybrid propulsion systems 100 and 200. At 310, where charging of the energy storage device is to be increased or initiated, the process flow may proceed to 312. As one example, the control system may assess the present state of charge (SOC) of the energy storage device, and judge whether the energy storage device should be charged or whether the rate of charging should be increased based on the assessment of the present SOC. For example, the control system may compare the SOC of the energy storage device to a lower or minimum SOC threshold that is stored in memory to judge whether charging should be initiated or whether the rate of charging should be increased. As a non-limiting example, the control system may be configured to maintain at least a minimum SOC at the energy storage device. Alternatively, if charging of the energy storage device is not to be increased or initiated, the process flow may return.

At 312, the process flow may proceed to 314 if a multi-stroke operation is to be performed by the engine. Alternatively, if the multi-stroke operation is not to be performed by the engine, the process flow may proceed to 320. As one example, the control system may identify whether the number of strokes performed by the engine per combustion cycle may be adjusted to increase the engine output. The control system may assess the current operating conditions of the engine, including one or more of the engine speed, engine temperature, engine load (air charge), and the number of strokes currently performed by the engine to determine whether the multi-stroke operation should be performed. The control system may also diagnose engine hardware to determine whether the multi-stroke operation may be performed, or whether there is a fault that may preclude transitioning the engine between modes utilizing different numbers of strokes per combustion cycle.

At 314, the engine output may be increased by reducing the number of strokes performed by the engine per combustion cycle. For example, the control system may transition the engine from a four stroke cycle to a two stroke cycle. Operation in the two stroke cycle increases the power density of the engine as compared to the four stroke cycle, thereby enabling the engine output (e.g. torque) to be increased for a given engine load and speed.

At 316, charging of the energy storage device may be increased or initiated by an amount or rate that corresponds to the increased engine output resulting from the operation at 314. For example, the generator may be operated to increase the amount of engine torque absorbed from the engine output in response to the transition from the four stroke cycle to the two stroke cycle. This increase in the amount of engine torque absorbed by the generator may be used to maintain the requested output, as requested by the vehicle operator as delivered to the drive wheels, through the transition to the two stroke cycle from the four stroke cycle. The operations at 314 and 316 may be performed while maintaining the same selected gear ratio at the transmission. In this way, the energy storage device may be charged without requiring that the transmission be shifted to a lower gear in order to maintain the wheel torque (i.e. propulsive effort) requested by the vehicle operator. In other embodiments, the gear ratio of the transmission may be optionally adjusted in response to the operations performed at 314 and 316 by upshifting or downshifting the transmission.

At 318, the control system may optionally adjust the engine output after the number of strokes performed by the engine per combustion cycle has been reduced at 314 in order to meet the engine output demands requested by the vehicle operator and the generator. For example, the transition from the four stroke cycle to the two stroke cycle may be used to achieve a substantial increase in the engine output for purposes of increasing or initiating a charging operation, while the amount of air and fuel delivered to the engine may be varied at 318 after the transition is performed in order to match the propulsive effort that is requested by the vehicle operator in light of the increased amount of engine output that is absorbed by the generator.

As one example, if the engine output after the transition would otherwise be greater than the total engine output that is requested by the generator and vehicle operator, the control system may reduce the air and fuel delivered to the engine cylinders per combustion cycle in order to reduce the engine output. As another example, if the engine output after the transition would otherwise be less than the total engine output that is requested by the generator and vehicle operator, the control system may increase the air and fuel delivered to the engine cylinders per combustion cycle in order to further increase the engine output. In some examples, the control system may adjust the air and fuel based on a prescribed air/fuel ratio in response to feedback received from an air/fuel ratio sensor (e.g. exhaust oxygen sensor) arranged in an exhaust passage of the engine.

Alternatively, if the answer at 312 is judged no (i.e. the multi-stroke operation is not to be performed), the process flow may proceed to 320. As another example, the control system may judge the answer at 312 to be no if the engine is already currently operating in the two stroke cycle. At 320, the gear ratio of the transmission may be increased. For example, the control system may command the transmission to perform a downshift from a higher gear to a lower gear in order to increase the wheel torque that may be delivered to the wheels by the engine.

At 322, charging of the energy storage device may be initiated or increased. For example, the control system may operate the generator to increase the amount of the engine output that is absorbed and converted to electrical energy for storage at the energy storage device. Since the transmission is downshifted at 320, sufficient wheel torque may be provided in accordance with the vehicle operators request while increasing the rate of charging of the energy storage device. In some examples, the charging performed at 322 may be less than or at a lower rate than the charging performed at 316, since operation of the engine in a two stroke cycle can produce substantially more torque than operation of the engine in a four stroke cycle for a given set of operating conditions. At 324, the engine output may be adjusted by the control system by varying the amount of air and fuel delivered to the engine as previously described with reference to 318. However, the adjustment at 324 may differ from the adjustment that would otherwise be performed at 318, since the engine has continued to operate in the four stroke cycle rather than transitioning to the two stroke cycle. From 318 or 324, the process flow may return.

As a non-limiting example, the process flow of FIG. 3 may be used to operate the engine to produce an engine output; selectively operate the generator to charge the energy storage device by absorbing an amount of the engine output; adjust a number of strokes performed by the engine per combustion cycle in response to the SOC of the energy storage device; and adjust the amount of the engine output absorbed by the generator in response to the number strokes performed by the engine per combustion cycle. In this way, the control system may be configured to charge the energy storage device at a higher rate during operation of the engine in the two stroke cycle than during the four stroke cycle. In some embodiments, charging of the energy storage device may not be performed when the engine is operating in the four stroke cycle, whereby charging of the energy storage device is only performed when the engine is operating in the two stroke cycle. As such, operations 320, 322, and 324 may be optionally omitted from the process flow of FIG. 3.

As another non-limiting example, the process flow of FIG. 3 may be used to operate the hybrid propulsion system to: during a first condition, operate the engine in a two stroke cycle to produce a first engine output and charge the energy storage device by absorbing a first amount of the first engine output at the generator; and during a second condition, operate the engine in a four stroke cycle to produce a second engine output. In some examples, during the second condition, the energy storage device may be charged by absorbing a second amount of the engine output at the generator. The first engine output may be substantially greater than the second engine output in some examples. In some examples, the first amount of the engine output absorbed by the generator during the first condition may be substantially greater than the second amount of the engine output absorbed by the generator during the second condition. As one example, the first condition may include a greater vehicle operator requested output from the hybrid propulsion system and the second condition may include a lesser vehicle operator requested output from the hybrid propulsion system as will be described with reference to the process flows of FIGS. 4 and 5. As another example, the first condition may include a lower state of charge of the energy storage device than the second condition.

Figure 4:
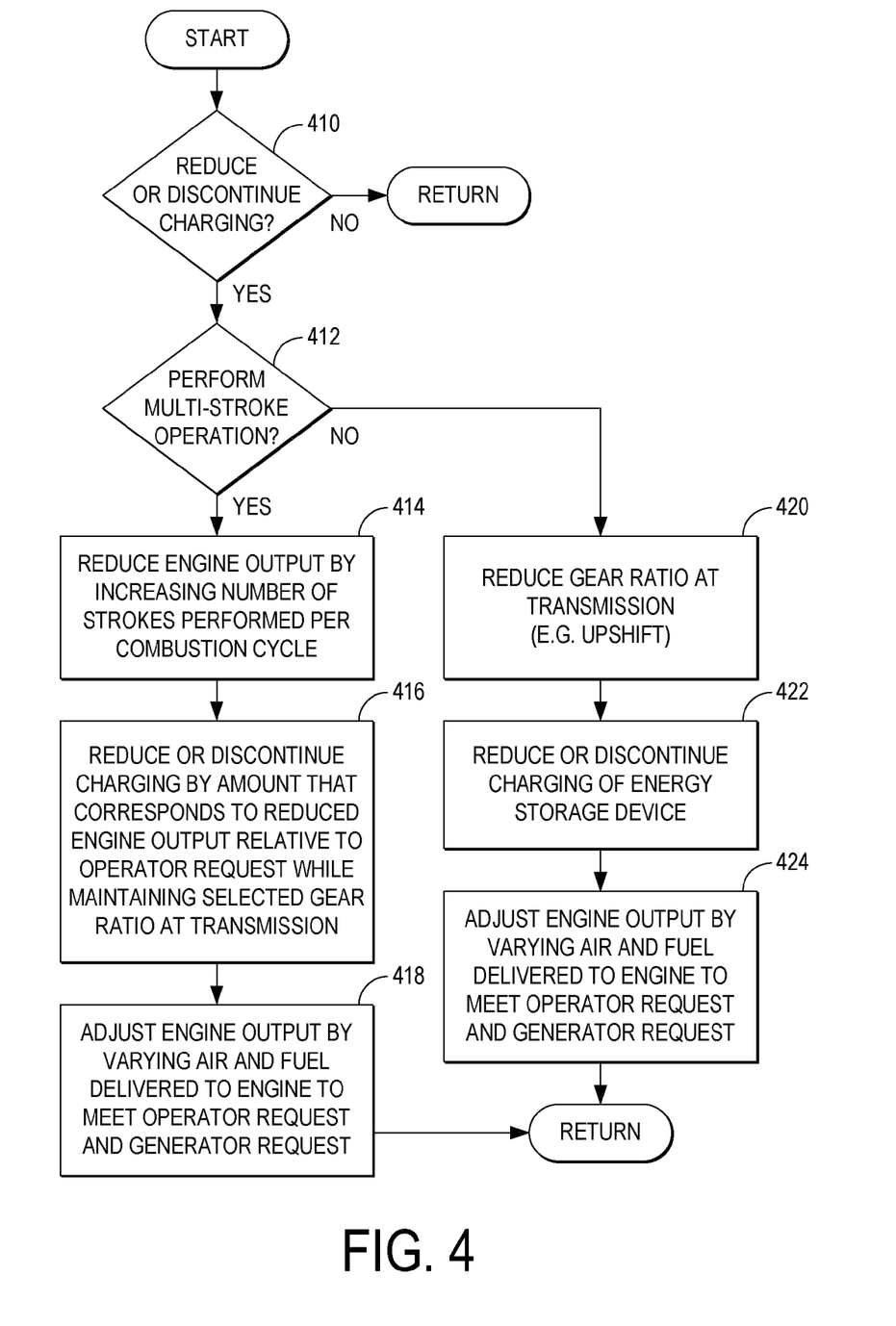

FIG. 4 shows another flow chart depicting a process flow that may be utilized with a hybrid propulsion system for a vehicle, including hybrid propulsion systems 100 and 200. The process flow of FIG. 4 differs with respect to the process flow of FIG. 3 by instead facilitating a reduction of a charging operation for the energy storage device rather than facilitating an increase of the charging rate.

For example, at 410, it may be judged whether to reduce or discontinue charging of the energy storage device. As one example, the control system may reference a maximum SOC value stored in memory for the energy storage device, whereby the charging operation may be adjusted to maintain the SOC of the energy storage device below the maximum SOC. In this way, the control system may be configured to maintain the SOC of the energy storage device within a lower bounded value (e.g. via the process flow of FIG. 3) and an upper bounded value (e.g. via the process flow of FIG. 4).

If the answer at 410 is judged no, the process flow may return. Alternatively, if the answer at 410 is judged yes, the process flow may proceed to 412. At 412, it may be judged whether the engine should perform a multi-stroke operation. As one example, the control system may consider the operating conditions previously described with reference to 312. As one example, the control system may judge whether the engine is presently operating in a mode that provides the highest number of strokes per combustion cycle that may be performed by the engine. For example, the control system may judge whether the engine is currently operating in the two stroke cycle or the four stroke cycle, and if the engine is currently operating in the four stroke cycle, the answer at 412 may be judged no.

If the answer at 412 is judged yes, the process flow may proceed to 414. At 414, the engine output may be reduced by increasing the number of strokes performed by the engine per combustion cycle. For example, the control system may transition the engine from a two stroke cycle to a four stroke cycle to substantially reduce the power density of the engine, thereby reducing the engine output. At 416, the charging operation of the energy storage device may be reduced or discontinued by an amount or rate that corresponds to the amount by which the engine output has been reduced by the operation at 414. For example, the amount of engine output absorbed by the generator may be reduced to an amount that corresponds to a difference between the engine output and the vehicle operator requested wheel torque. Since the generator reduces the engine output that is absorbed for purposes of charging the energy storage device, the vehicle operator requested output may be achieved while maintaining the currently selected gear ratio at the transmission, even when the engine is transitioned from a two stroke cycle to a four stroke cycle. In other embodiments, the gear ratio of the transmission may be optionally adjusted in response to the operations performed at 414 and 416 by upshifting or downshifting the transmission.

At 418, the control system may optionally adjust the engine output after the number of strokes performed by the engine per combustion cycle has been increased at 414 in order to meet the engine output demands requested by the vehicle operator and the generator (if any). For example, the transition from the two stroke cycle to the four stroke cycle may be used to achieve a substantial reduction in the engine output for purposes of reducing or discontinuing a charging operation, while the amount of air and fuel delivered to the engine may be varied at 418 after the transition is performed in order to match the wheel torque requested by the vehicle operator in light of the reduction in the amount of the engine output that is absorbed by the generator.

As one example, if the engine output after the transition would otherwise be greater than the total engine output that is requested by the generator and vehicle operator, the control system may reduce the air and fuel delivered to the engine cylinders per combustion cycle in order to reduce the engine output. As another example, if the engine output after the transition would otherwise be less than the total engine output that is requested by the generator and vehicle operator, the control system may increase the air and fuel delivered to the engine cylinders per combustion cycle in order to further increase the engine output.

If the answer at 412 is judged no, the process flow may instead proceed to 420. At 420, the gear ratio of the transmission may be reduced. For example, the control system may upshift the transmission from a lower gear to a higher gear as the generator request is reduced at 422. For example, at 422, the amount of torque absorbed from the engine by the generator may be reduced to discontinue or reduce the charging of the energy storage device, while the engine continues to deliver the requested wheel torque. At 424, the engine output may be adjusted by the control system by varying the amount of air and fuel delivered to the engine as previously described with reference to 418. However, the adjustment at 424 may differ from the adjustment that would otherwise be performed at 418, since the engine has continued to operate in the two stroke cycle rather than transitioning to the four stroke cycle. From 418 or 424, the process flow may return.

Figure 5:
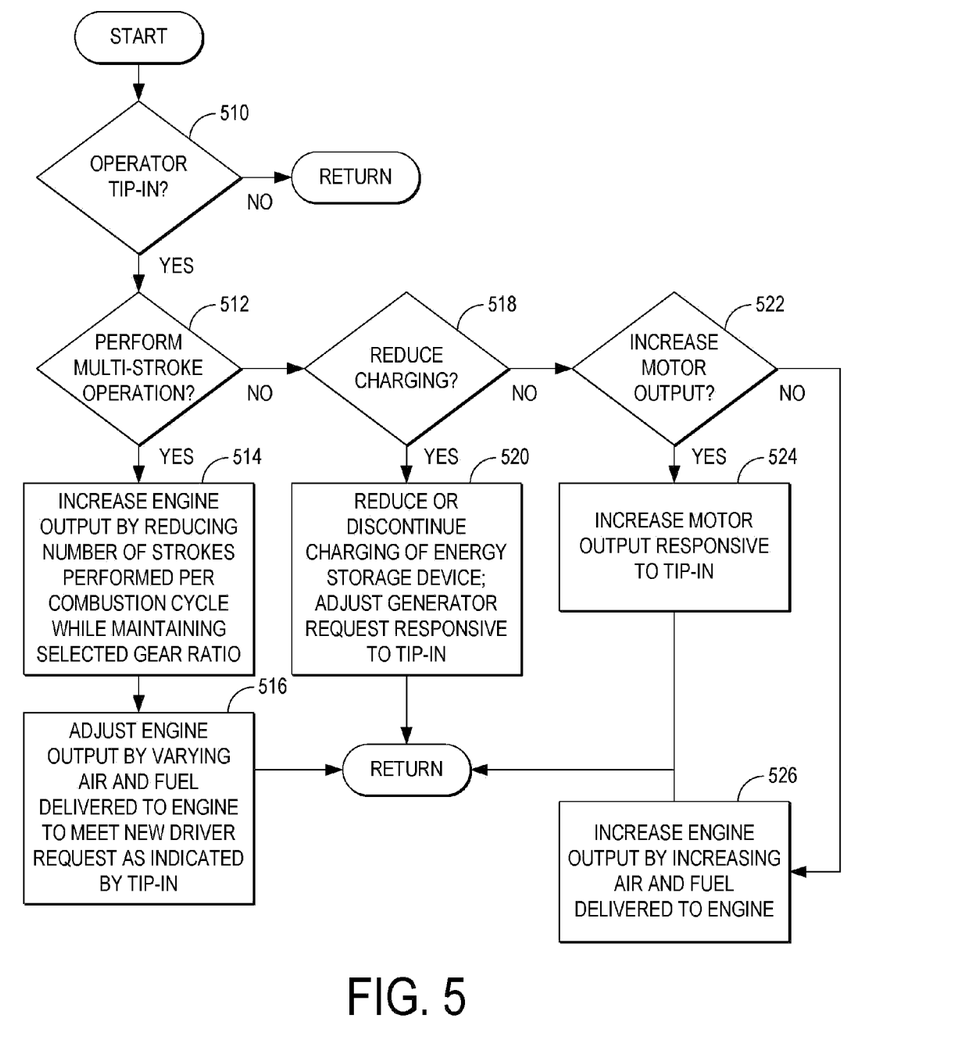
Figure 6:
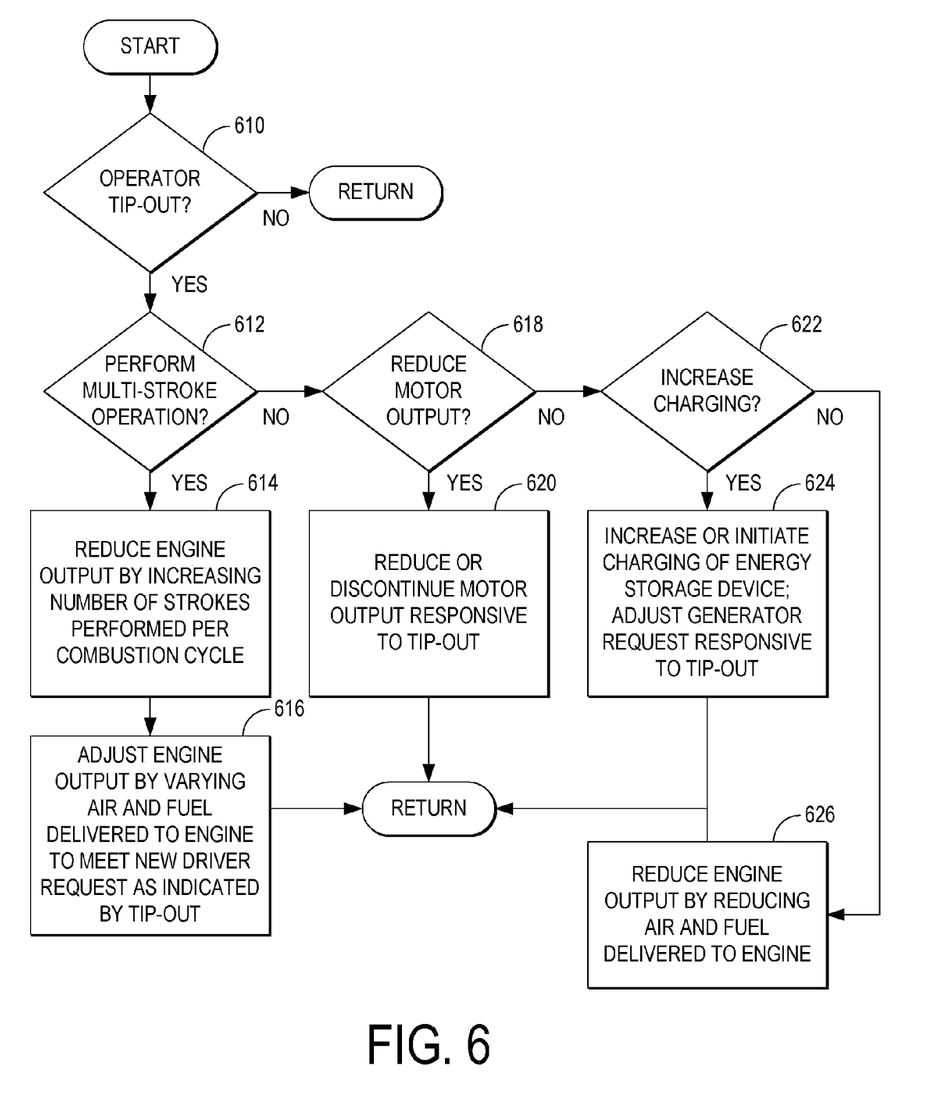

FIGS. 5 and 6 show flow charts depicting a process flows that may be utilized with a hybrid propulsion system for a vehicle, including hybrid propulsion systems 100 and 200. FIG. 5 depicts a process flow that may be used to respond to a vehicle operator initiated tip-in. FIG. 6 depicts a process flow that may be used to respond to a vehicle operator initiated tip-out. A tip-in refers to a requested increase in the wheel torque, while a tip-out refers to a requested reduction in the wheel torque. A tip-in or tip-out may be initiated by the vehicle operator via a user input device such as an accelerator pedal or via a prescribed cruise control setting as selected by the vehicle operator.

Referring to FIG. 5, it may be judged at 510 whether a tip-in has been received by the control system. If the answer at 510 is judged no, the process flow may return. Alternatively, if the answer at 510 is judged yes, the process flow may proceed to 512. At 512, it may be judged whether the control system should respond to the tip-in by performing a multi-stroke operation. The control system may again consider the previously described operating conditions of 312.

If the answer at 512 is judged yes, the process flow may proceed to 514, where the engine output may be increased by reducing the number of strokes performed by the engine per combustion cycle. For example, the control system may transition the engine from a four stroke cycle to a two stroke cycle. The operation at 514 may be performed while maintaining the selected gear ratio at the transmission. In other words, the control system may respond to a tip-in by transitioning the engine to a two stroke cycle rather than downshifting the transmission. In other embodiments, the gear ratio of the transmission may be optionally adjusted in response to the operations performed at 514.

At 516, the engine output may be further adjusted by varying the air and fuel delivered to the engine cylinders to meet the new driver requested wheel torque as indicated by the tip-in. For example, where the transition of the engine to the two stroke cycle would otherwise create more wheel torque than is requested by the vehicle operator as indicated by the tip-in, the control system may reduce the air and fuel delivered to the engine cylinders after the transition. Conversely, where the transition of the engine to the two stroke cycle would otherwise create less wheel torque than is requested by the vehicle operator as indicated by the tip-in, the control system may increase the air and fuel delivered to the engine cylinders after the transition.

If the answer at 512 is judged no, the process flow may proceed to 518 where it may be judged whether charging of the energy storage device is to be reduced or discontinued in response to the tip-in. The control system in judging whether to reduce the charging of the energy storage device may again assess the SOC in comparison to the minimum and maximum SOC limits, as well as the magnitude of the tip-in. For a tip-in of higher magnitude, the control system may judge the answer at 518 to be yes, whereas for a tip-in of a lower magnitude, the control system may continue to charge the energy storage device at a similar rate.

If the answer at 518 is judged yes, the process flow may proceed to 520. At 520, the charging of the energy storage device may be reduced or discontinued by reducing the amount of engine output absorbed by the generator. The amount by which the generation rate is reduced may be adjusted in response to the magnitude of the tip-in to enable the requested wheel torque to be met by the engine without requiring the engine output to be substantially increased. In some embodiments, the gear ratio of the transmission may be optionally increased (e.g. downshifted) in response to the operations performed at 520 to further increase the wheel torque.

If the answer at 518 is judged no, the process flow may proceed to 522 where it may be judged whether the motor output is to be increased in response to the tip-in in order to supplement the engine output. As one example, the control system may judge the answer at 522 to be yes if the SOC of the energy storage device is greater than the minimum threshold SOC. At 524, the charging operation of the energy storage device may be discontinued and the motor output may be increased in response to the tip-in. For example, the control system may increase the motor output by an amount that is proportional to the tip-in to supplement the engine output by supplying energy from the energy storage device to the motor. In this way, the requested wheel torque may be provided by the engine and motor without requiring the engine output to be increased in response to the tip-in. In some embodiments, the gear ratio of the transmission may be optionally increased (e.g. downshifted) in response to the operations performed at 524 to further increase the wheel torque.

Alternatively, if the answer at 522 is judged no, the process flow may proceed to 526, where the engine output may be increased by increasing the amount of air and fuel delivered to the engine cylinders. In some embodiments, the gear ratio of the transmission may be optionally increased (e.g. downshifted) in response to the operations performed at 526 to further increase the wheel torque. From 516, 520, 524, and 526, the process flow may return.

As a non-limiting example, the process flow of FIG. 5 may be used to increase the level of propulsive effort provided to the drive wheels during a lower SOC of the energy storage device by reducing a number of strokes performed by the engine per combustion cycle to increase the engine output produced by the engine; and increase the level of propulsive effort (e.g. wheel torque) provided to the drive wheels during a higher SOC of the energy storage device by increasing an amount of energy supplied to the motor from the energy storage device to increase the motor output produced by the motor. In this way, the control system may respond to a tip-in in different ways depending on whether the energy storage device is able to provide sufficient energy to the motor for supplementing the engine output, as indicated by the SOC of the energy storage device.

Referring to FIG. 6, it may be judged at 610 whether a tip-out has been received by the control system. If the answer at 610 is judged no, the process flow may return. Alternatively, if the answer at 610 is judged yes, the process flow may proceed to 612. At 612, it may be judged whether the control system should respond to the tip-out by performing a multi-stroke operation. The control system may again consider the previously described operating conditions of 312.

If the answer at 612 is judged yes, the process flow may proceed to 614, where the engine output may be reduced by increasing the number of strokes performed by the engine per combustion cycle. For example, the control system may transition the engine from a two stroke cycle to a four stroke cycle. The operation at 612 may be performed while maintaining the selected gear ratio at the transmission. In other words, the control system may respond to a tip-out by transitioning the engine to a four stroke cycle rather than downshifting the transmission. However, in some examples, the operation at 614 may be performed with a downshift or an upshift of the transmission.

At 616, the engine output may be further adjusted by varying the air and fuel delivered to the engine cylinders to meet the newly requested wheel torque as indicated by the tip-out. For example, where the transition of the engine to the four stroke cycle would otherwise create more wheel torque than is requested by the vehicle operator as indicated by the tip-out, the control system may reduce the air and fuel delivered to the engine cylinders after the transition. Conversely, where the transition of the engine to the four stroke cycle would otherwise create less wheel torque than is requested by the vehicle operator as indicated by the tip-out, the control system may increase the air and fuel delivered to the engine cylinders after the transition.

If the answer at 612 is judged no, the process flow may proceed to 618 where it may be judged whether to reduce the motor output. If the answer at 618 is judged yes, the process flow may proceed to 620 where the motor output that supplements the engine output may be reduce or discontinued in response to the tip-out.

Alternatively, if the answer at 618 is judged no, the process flow may proceed to 622 where it may be judged whether to increase charging of the energy storage device. The control system may consider whether the energy storage device is able to accept an additional charge by referencing the current SOC as compared to the maximum threshold SOC. If the answer at 622 is judged yes, the process flow may proceed to 624 where the generator may be operated to increase or initiate charging of the energy storage device. The amount of engine output requested by the generator may be adjusted in response to the magnitude of the tip-out. For example, the generator may absorb the excess engine torque that is produced by the engine to charge the energy storage device.

Alternatively, if the answer at 622 is judged no, the process flow may proceed to 626, where the engine output may be reduced by decreasing the amount of air and fuel delivered to the engine cylinders. From 616, 620, 624, and 626, the process flow may return.

Figure 7:
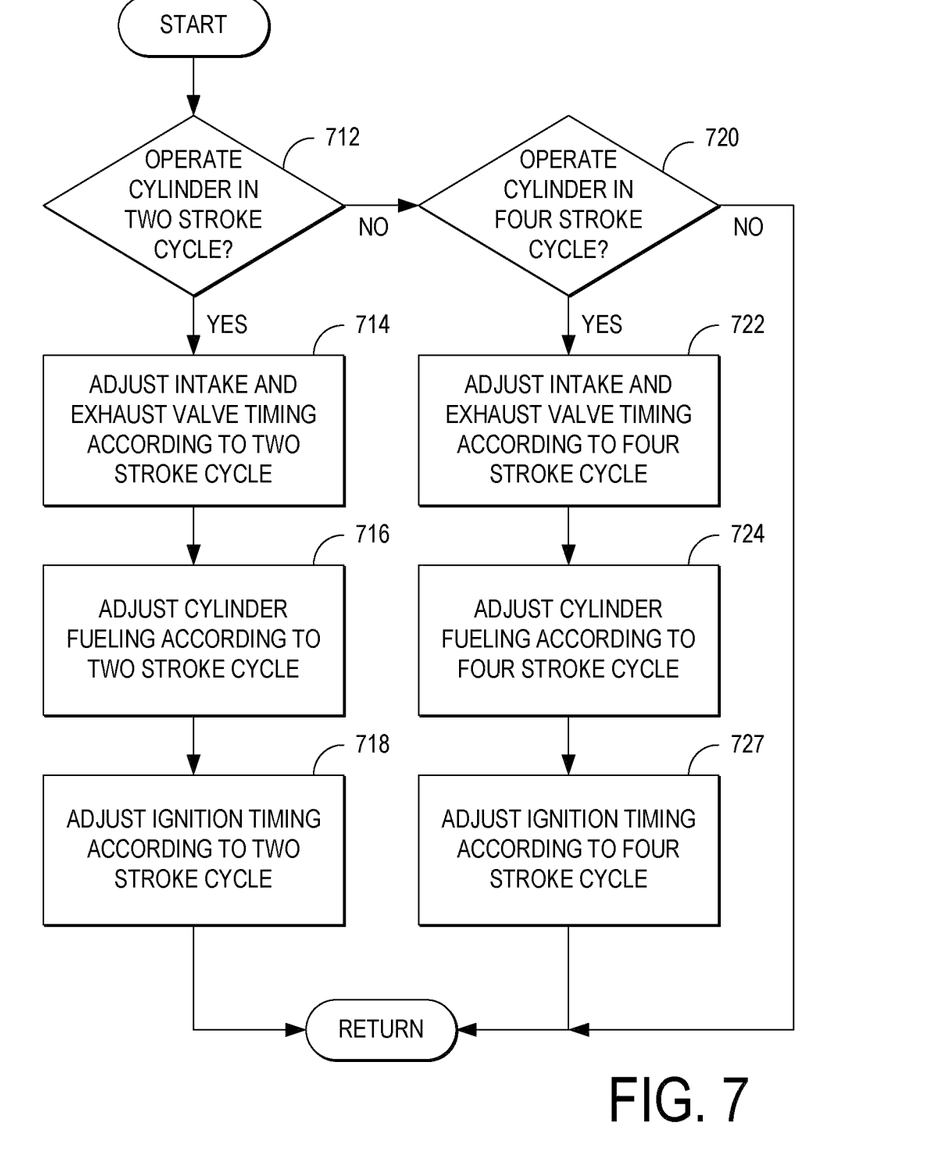

FIG. 7 illustrates a flow chart depicting an example process flow that may be performed by the control system to transition the cylinders between a two stroke cycle and a four stroke cycle. At 712 it may be judged whether to operate a cylinder of the engine in the two stroke cycle in accordance with the process flow of FIGS. 3-6. If the answer at 712 is yes, the control system may adjust one or more of the cylinder's intake and/or exhaust valve timing at 714, the cylinder fueling at 716, and the ignition timing at 718 according to the two stroke cycle.

Alternatively, if the answer at 712 is judged no, the process flow may proceed to 720 where it may be judged whether to operate the cylinder in the four stroke cycle in accordance with the process flow of FIGS. 3-6. If the answer at 720 is yes, the process flow may adjust one or more of the cylinder's intake and/or exhaust valve timing at 722, the cylinder fueling at 716, and the ignition timing at 718 according to the four stroke cycle. Furthermore, in some embodiments, throttle position may be adjusted in response to the particular operating mode of the engine to vary intake airflow supplied to the cylinders that are carrying out combustion.

Figure 8:
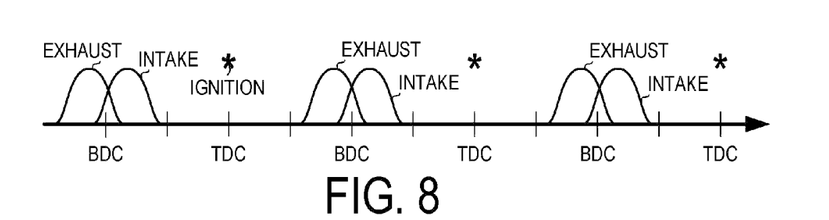
FIGS. 8 and 9 show timelines depicting two stroke and four stroke engine operation.
Figure 9:
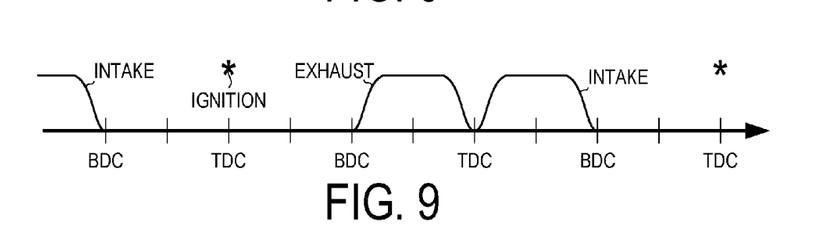

Referring also to FIGS. 8 and 9, timing diagrams are depicted for an example cylinder operating in a two stroke cycle and a four stroke cycle, respectively. An indication of time is provided along the horizontal axes of FIGS. 8 and 9 with reference to piston position. Top dead center (TDC) and bottom dead center (BDC) represent the piston position relative to the cylinder as it reciprocates throughout operation of the engine. A comparison of FIGS. 8 and 9 illustrates how the intake and exhaust valves of the cylinder may be opened twice as often in the two stroke cycle as the four stroke cycle. Further, fuel may be delivered to the engine at twice the frequency during the two stroke cycle as the during the four stroke cycle. For example, the cylinder may be fueled approximately every 360 crank angle degrees during the two stroke cycle and approximately every 720 degrees during the four stroke cycle. Further still, ignition of the air and fuel charge within the cylinder may be performed around each TDC (e.g. approximately every 360 crank angle degrees) in the two stroke cycle, and may be performed around every other TDC in the four stroke cycle (e.g. approximately every 720 crank angle degrees).

Figure 10:
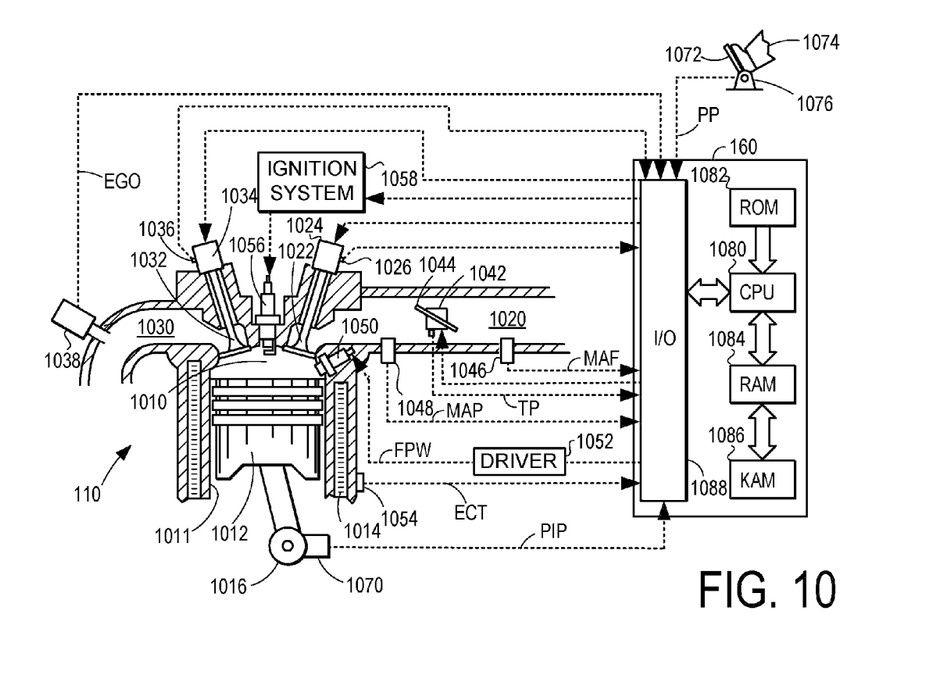
FIG. 10 depicts an example cylinder of an internal combustion engine.

FIG. 10 illustrates a schematic depiction of an example cylinder 1010 of engine 110 including the intake and exhaust system components that interface with the various cylinders of the engine. Note that cylinder 110 may correspond to one or more of the previously described multi-stroke cylinders. Cylinder 1010 is at least partially defined by combustion chamber walls 1011 and piston 1012. Piston 1012 may be coupled to a crankshaft 1016 via a crank arm, along with other pistons of the engine. Crankshaft 1016 may be operatively coupled with drive wheels 130 via transmission 120 as depicted in FIGS. 1 and 2.

Cylinder 1010 may receive intake air via an intake passage 1020. Intake passage 1020 may also communicate with other cylinders of engine 110. Intake passage 1020 may include a throttle 1042 including a throttle plate 1044 that may be adjusted by control system 160 to vary the flow of intake air that is provided to the engine cylinders. Cylinder 1010 can communicate with intake passage 1020 via one or more intake valves 1022. As a non-limiting example, these intake valves may be configured as intake poppet valves that are arranged near the top or upper region of cylinder 1010. However, in other embodiments, these intake valves may be arranged in a lower region of the cylinder.

Cylinder 1010 may exhaust products of combustion via an exhaust passage 1030. Cylinder 1010 can communicate with exhaust passage 1030 via one or more exhaust valves 1032. As a non-limiting example, these exhaust valves may be configured as exhaust poppet valves that are arranged near the top or upper region of cylinder 1010.

In some embodiments, cylinder 1010 may optionally include a spark plug 1056, which may be actuated by an ignition system 1058. A fuel injector 1050 may be provided in the cylinder to deliver fuel directly thereto. However, in other embodiments, the fuel injector may be arranged within intake passage 1020 upstream of intake valve 1022. Fuel injector 1050 may be actuated by a driver 1052.

A non-limiting example of control system 160 is depicted schematically in FIG. 10. Control system 160 may include a processing subsystem (CPU) 1080, which may include one or more processors. CPU 1080 may communicate with memory, including one or more of read-only memory (ROM) 1082, random-access memory (RAM) 1084, and keep-alive memory (KAM) 1086. As a non-limiting example, this memory may stored operating condition information as well as the process flows described herein.

CPU 1080 can communicate with various sensors and actuators of engine 110 via an input/output device 1088. As a non-limiting example, these sensors may provide operating condition information to the control system, and may include: an indication of mass airflow (MAF) through intake passage 1020 via sensor 1046, an indication of manifold air pressure (MAP) via sensor 1048, an indication of throttle position (TP) via throttle 1042, an indication of engine coolant temperature (ECT) via sensor 1054 which may communicate with coolant passage 1014, an indication of engine speed (PIP) via sensor 1070, an indication of exhaust gas oxygen content (EGO) via sensor 1038, an indication of a request or input (PP) from vehicle operator 1074 via position sensor 1076 of pedal 1072, an indication of intake valve position via sensor 1026, and an indication of exhaust valve position via sensor 1036, among others.

Furthermore, the control system may control operation of the engine 110, including cylinder 1010 via one or more of the following actuators: driver 1052 to vary fuel injection timing and quantity, ignition system 1058 to vary spark timing, intake valve actuator 1024 to vary intake valve timing, exhaust valve actuator 1034 to vary exhaust valve timing, and throttle 1042 to vary the position of throttle plate 1044, among others. Note that intake and exhaust valve actuators 1024 and 1034 may include electromagnetic valve actuators (EVA) and/or cam-follower based actuators.

FIGS. 11 and 12 show timelines depicting example transitions between two and four stroke operation. FIGS. 11A-11D depict transitions from the four stroke cycle to the two stroke cycle.

Figure 11A:
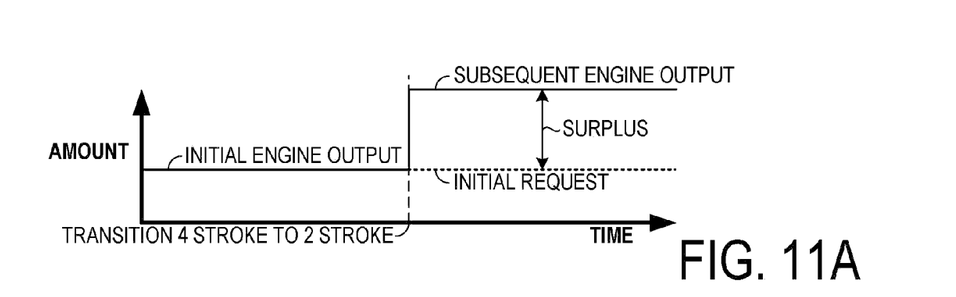
FIGS. 11 and 12 show timelines depicting example transitions between two and four stroke operation.

Referring to FIG. 11A, a transition is performed from the four stroke cycle to the two stroke cycle where the initial engine output before the transition is satisfying the driver requested level of propulsive effort, indicated as initial request. As the engine is transitioned to the two stroke cycle (e.g. in response to a charging request), the engine output substantially increases, thereby creating a surplus between the requested wheel torque and the engine output torque. The generator may in turn absorb this surplus engine output, converting it to electrical energy, where it may be stored at the energy storage device.

Figure 11B:
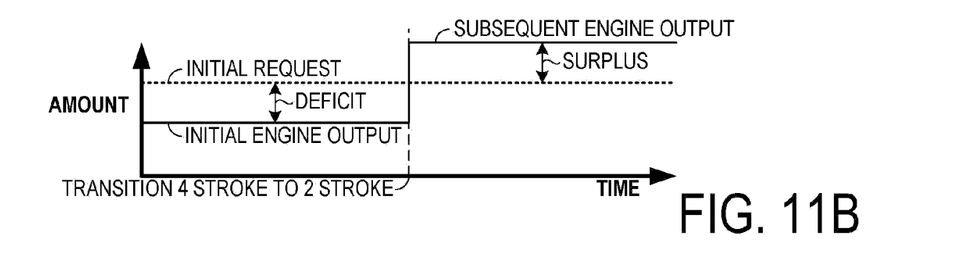

FIG. 11B shows an example where the initial requested wheel torque is greater than the initial engine output torque before the transition, thereby creating a torque deficit. This torque deficit may be filled by the motor providing positive torque to assist the engine propel the vehicle. As the engine is transitioned to the two stroke cycle (e.g. in response to a charging request), the engine output may be increased to a level that is greater than the level requested by the vehicle operator. This surplus may again be absorbed by the generator and stored at the energy storage device.

Figure 11C:
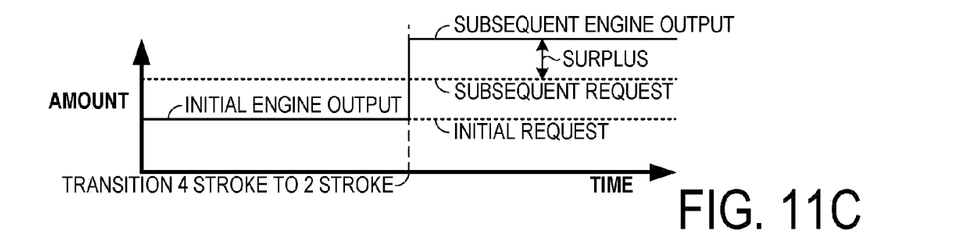
Figure 11D:
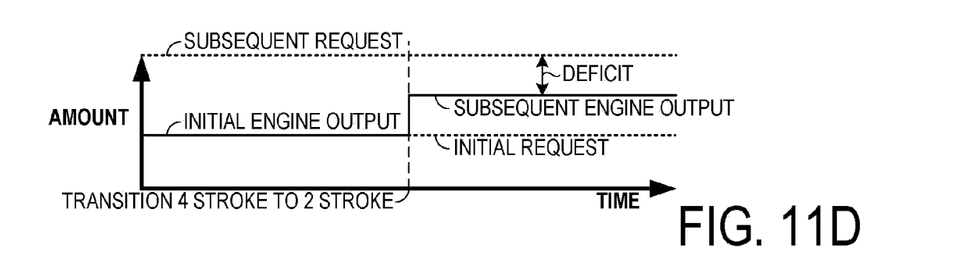

FIGS. 11C and 11D show examples where the engine is transitioned to the two stroke cycle in response to a tip-in. In FIG. 11C, the engine after the transition may produce a surplus to the subsequent requested wheel torque as indicated by the tip-in (i.e. subsequent request). This surplus may be absorbed by the generator and stored at the energy storage device. As shown in FIG. 11D, the engine after the transition may produce a deficit to the subsequent request indicated by the tip-in. The motor may be operated to supplement the engine output, thereby filling the torque deficit after the transition is performed. In this way, the hybrid propulsion system may respond to a tip-in or a charging request without requiring transmission shifting.

Figure 12A:
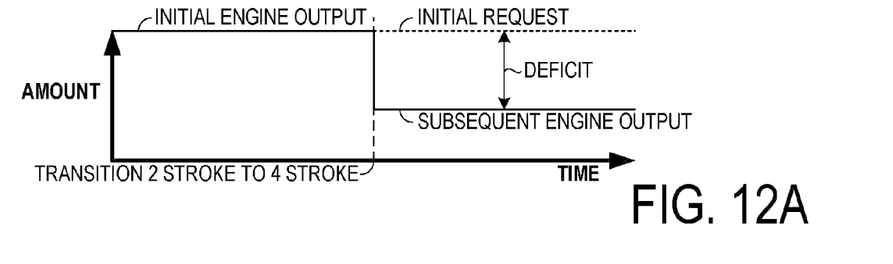

FIGS. 12A-12D show examples where the engine is transitioned from the two stroke cycle to the four stroke cycle. As shown in FIG. 12A, the engine may be initially operated to meet the initial request. The engine may be transitioned to the four stroke cycle (e.g. in response to a reduction or discontinuation of a charging operation). The transition to the four stroke cycle may cause a substantial reduction in the engine output torque, which may create a deficit relative to the requested wheel torque. The motor may be operated to reduce or eliminate this deficit, thereby enabling engine operation in the four stroke cycle.

Figure 12B:
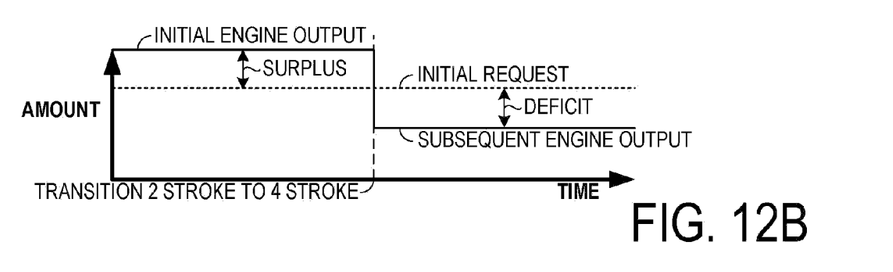

FIG. 12B shows an example where the engine is initially operating to produce surplus torque that can be stored at the energy storage device. After the transition is performed, the motor may again be operated to supplement the engine output to reduce or eliminate the torque deficit.

Figure 12C:
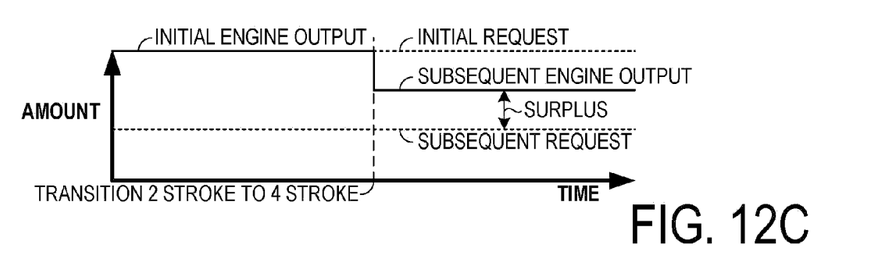
Figure 12D:
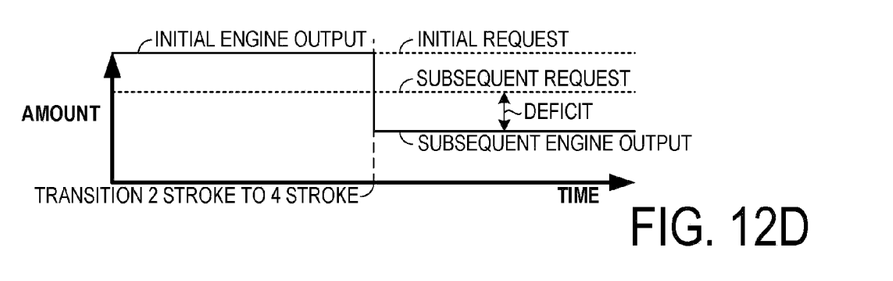

FIGS. 12C and 12D show examples where a transition from the two stroke cycle to the four stroke cycle is initiated by a tip-out. As shown in FIG. 12C, the surplus engine output that is produced after the transition in relation to the subsequent torque request (as indicated by the tip-out) may be absorbed by the generator and used to charge the energy storage device. FIG. 12D shows how a torque deficit may occur after the transition, which may be reduced or eliminated by operating the motor to supplement the engine output. In each of these examples, operation of the engine, motor, and generator may be coordinated to provide improved charging response as well as improving the responsiveness of the hybrid propulsion system to requests of the vehicle operator.

Note that the example control and estimation process flows included herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle hybrid propulsion system comprising:
    operating a vehicle engine in a two-stroke cycle to produce a first torque, and charging a battery by absorbing a first torque amount at a generator; and then
    operating the engine in a four-stroke cycle to produce a second torque lower than the first, and charging the battery by absorbing a second torque amount, less than the first torque amount, at the generator.

2. The method of claim 1, where said charging the battery by absorbing the first torque amount includes charging the battery at a first rate; and where said charging the battery by absorbing the second torque amount includes charging the battery at a second rate that is substantially lower than the first rate.

3. The method of claim 1, where said charging the battery by absorbing the first torque amount occurs during a greater vehicle operator requested output from the hybrid propulsion system and where said charging the battery by absorbing the second torque amount occurs during a lesser vehicle operator requested output from the hybrid propulsion system.

4. The method of claim 1, where said charging the battery by absorbing the first torque amount occurs during a lower battery state of charge and where said charging the battery by absorbing the second torque amount occurs during a higher battery state of charge.

5. The method of claim 1, further comprising:
    transitioning the engine between operation in the two-stroke cycle and operation in the four-stroke cycle while maintaining a transmission in a same gear ratio.

6. A method of operating a hybrid propulsion system for a vehicle, including an internal combustion engine, a generator, and an energy storage device, the method comprising:
    operating the engine to produce an engine output;
    selectively operating the generator to charge the energy storage device by absorbing an amount of the engine output;
    adjusting a number of strokes performed by the engine per combustion cycle in response to a state of charge of the energy storage device; and
    adjusting the amount of the engine output absorbed by the generator in response to the number of strokes performed by the engine per combustion cycle.

7. The method of claim 6, where said adjusting the number of strokes performed by the engine per combustion cycle includes reducing the number of strokes performed by the engine per combustion cycle in response to the state of charge attaining a lower threshold; and
    where said adjusting the amount of the engine output absorbed by the generator includes increasing the amount of the engine torque absorbed by the generator in response to the reduction in the number of strokes performed by the engine per combustion cycle.

8. The method of claim 7, where said reducing the number of strokes performed by the engine per combustion cycle includes transitioning the engine from a four-stroke cycle to a two-stroke cycle; and
    where said increasing the amount of the engine torque absorbed by the generator includes initiating charging of the energy storage device.

9. The method of claim 6, where said adjusting the number of strokes performed by the engine per combustion cycle includes increasing the number of strokes performed by the engine per combustion cycle in response to the state of charge attaining an upper threshold; and
    where said adjusting the amount of the engine output absorbed by the generator includes reducing the amount of the engine torque absorbed by the generator in response to the increase in the number of strokes performed by the engine per combustion cycle.

10. The method of claim 9, where said increasing the number of strokes performed by the engine per combustion cycle includes transitioning the engine from a two-stroke cycle to a four-stroke cycle; and
    where said reducing the amount of the engine torque absorbed by the generator includes discontinuing charging of the energy storage device.

11. A method of operating a hybrid propulsion system for a vehicle including an internal combustion engine, a generator, and an energy storage device, comprising:
    during a first condition, operating the engine in a two-stroke cycle to produce a first engine output and charging the energy storage device by absorbing a first amount of the first engine output at the generator;
    during a second condition, operating the engine in a four-stroke cycle to produce a second engine output; and
    transitioning the engine between operation in the two-stroke cycle and operation in the four-stroke cycle while maintaining a transmission in a same gear ratio.

12. The method of claim 11, further comprising:
    during the second condition, charging the energy storage device by absorbing a second amount of the engine output at the generator.

13. The method of claim 12, where the first engine output is substantially greater than the second engine output, and where the first amount absorbed by the generator during the first condition is substantially greater than the second amount absorbed by the generator during the second condition.

14. The method of claim 12, where said charging the energy storage device during the first condition includes charging the energy storage device at a first rate; and where said charging the energy storage device during the second condition includes charging the energy storage device at a second rate that is substantially lower than the first rate.

15. The method of claim 11, where the first condition includes a greater vehicle operator requested output from the hybrid propulsion system and the second condition includes a lesser vehicle operator requested output from the hybrid propulsion system.

16. The method of claim 11, where the first condition includes a lower state of charge of the energy storage device than the second condition.

17. The method of claim 11, where charging of the energy storage device is not performed during the second condition when the engine is operating in the four-stroke cycle.

* * * * *